United States Patent [19]

Schabert et al.

[11] 4,077,837

[45] Mar. 7, 1978

[54] PRESSURIZED-WATER REACTOR COOLANT PIPE CONTAINMENT

[75] Inventors: Hans-Peter Schabert, Erlangen; Leonhard Irion, Ruckersdorf; Wolfgang Braun, Buckenhof near Erlangen, all of Germany

[73] Assignee: Kraftwerk Union Aktiengesellschaft, Mulheim (Ruhr), Germany

[21] Appl. No.: 566,341

[22] Filed: Apr. 9, 1975

[30] Foreign Application Priority Data

Apr. 9, 1974 Germany ............................ 2417397

[51] Int. Cl.² ............................................. G21C 9/00
[52] U.S. Cl. ......................................... 176/38; 176/87
[58] Field of Search ..................... 176/37, 38, 43, 61, 176/87; 137/514.3

[56] References Cited

U.S. PATENT DOCUMENTS

| 3,240,678 | 2/1966 | Hemmerle et al. | 176/38 |
| 3,486,973 | 12/1969 | Georges et al. | 176/43 |
| 3,488,067 | 1/1970 | Sommer | 176/87 |
| 3,497,421 | 2/1970 | Thome | 176/87 |
| 3,506,540 | 4/1970 | Yevick et al. | 176/87 |
| 3,525,669 | 8/1970 | Germer | 176/87 |
| 3,713,969 | 11/1973 | Cahill | 176/38 |
| 3,743,576 | 7/1973 | Fortescue | 176/37 |
| 3,753,853 | 8/1973 | Schabert | 176/38 |
| 3,779,865 | 12/1973 | Schafstall et al. | 176/38 |
| 3,818,935 | 6/1974 | Karker et al. | 176/87 |

FOREIGN PATENT DOCUMENTS 1,237,487  6/1971  United Kingdom ............. 137/514.3

Primary Examiner—Samuel W. Engle
Assistant Examiner—S. A. Cangialosi
Attorney, Agent, or Firm—Kenyon & Kenyon, Reilly, Carr & Chapin

[57] ABSTRACT

A pressurized-water reactor coolant system has a main coolant pipe connecting with the reactor pressure vessel through a check valve. A tubular containment is fixed to the pressure vessel and extends over the check valve and connects with the pipe beyond the check valve.

7 Claims, 5 Drawing Figures

4,077,837

PRESSURIZED-WATER REACTOR COOLANT PIPE CONTAINMENT

BACKGROUND OF THE INVENTION

A pressurized-water reactor has its core contained by a pressure vessel to which the pipes of the reactor's coolant system connect. A break in the coolant system can result in a pressure release on the pressurized-water in the vessel so as to empty the vessel and deprive the core of cooling water.

A break in a cold pipe loop leg which returns the coolant to the pressure vessel, is particularly serious, because then the discharge from the pressure vessel is in a direction opposite to the normal coolant circulating direction. As a remedy, the prior art has proposed that the cold leg pipe of each reactor main coolant loop, be connected with the pressure vessel through a check valve which is normally open when the coolant flow is in the normal circulating direction, and which closes upon flow in a reverse direction. Therefore, in the event of a break in the cold pipe leg, the check valve closes and prevents loss of coolant from the pressure vessel.

However, the above arrangement does not protect against a break in the connection between the check valve and the pressure vessel or in the casing of the check valve.

SUMMARY OF THE INVENTION

According to the present invention, a tubular pressure-resistant containment is fixed to the pressure vessel in a pressure-resistant manner and extends over the check valve and is fixed to the pipe extending from the check valve, in a pressure-resistant manner. Therefore, a break in the check valve's connection with the pressure vessel or in the check valve casing itself, is safely contained. The check valve continues to perform its former function in the event of a break in the pipe line beyond the check valve.

The containment can be made in two sections with one section telescoped over the other to form a sliding fit which is tight enough to prevent excessive loss of coolant in the event the space between the containment and the check valve and vessel, receive escaping coolant. A small circumferential clearance can be made between the interior of the tubular containment and the exterior of the check valve, to provide for thermal radial expansion and contraction between these parts, but the interspacing need not be larger than for this purpose, thus keeping the outside dimensions of the containment relatively compact.

The check valve itself may be specially designed to provide a retarded closing action in the event of a sudden reverse coolant flow due to a break in the pipe beyond the check valve. This reduces the closing shock of the check valve and, therefore, reduces the chances that the valve's connection with the pressure vessel or the valve casing itself, might rupture.

BRIEF DESCRIPTION OF THE DRAWINGS

Specific examples of the principles of the present invention are illustrated by the accompanying drawings, in which.

DETAILED DESCRIPTION OF THE INVENTION

Figure 1:
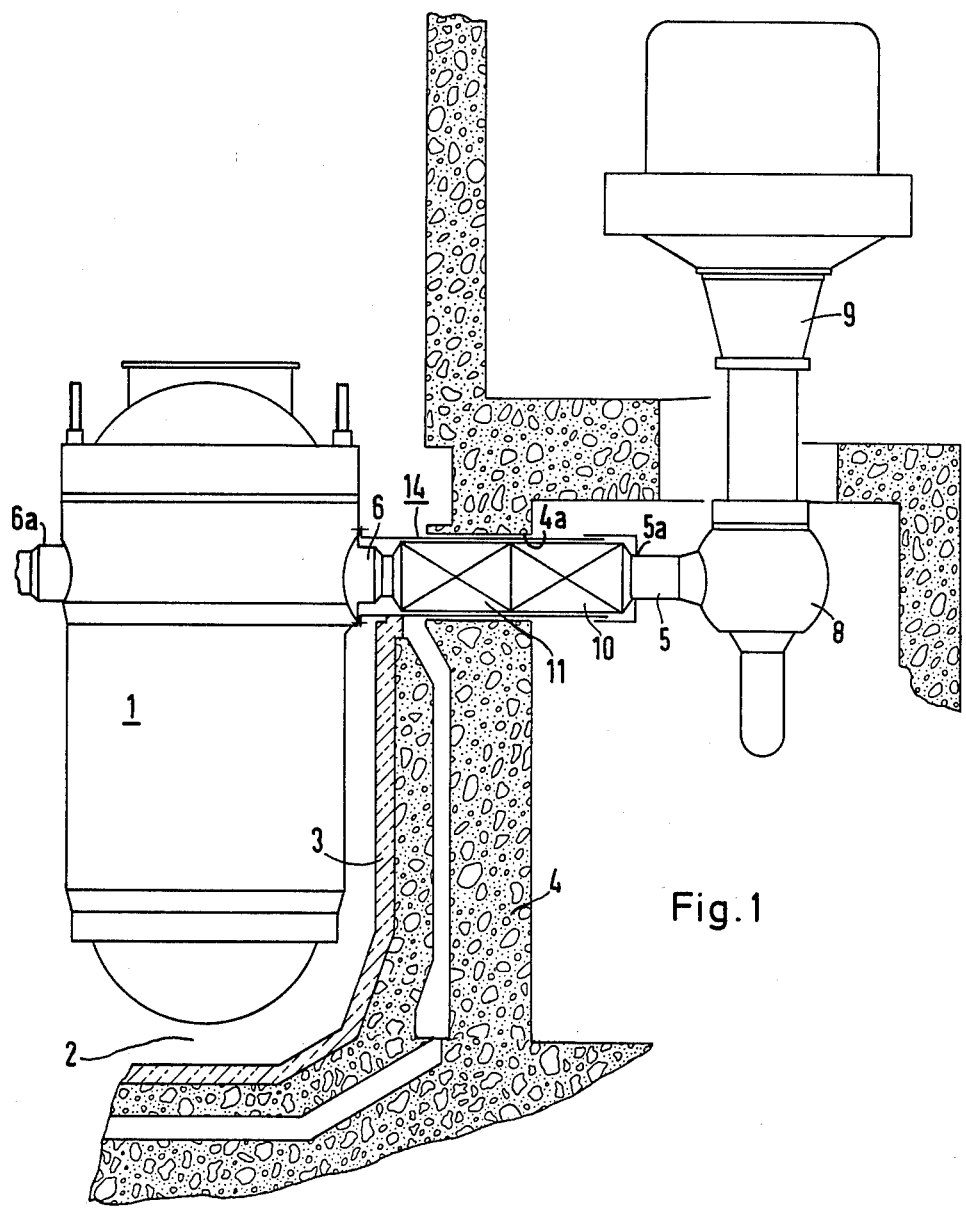
FIG. 1 shows a pressurized-water vessel in elevation together with the main coolant pump of one of the coolant loops, the containment being shown in vertical cross section as is the concrete construction surrounding the vessel and which is normally provided by the conventional pressurized-water reactor building.

Having reference to the above drawings, FIG. 1 shows the vertical pressure vessel 1 of a pressurized-water power reactor, in its pit 2 and surrounded by thermal insulation 3 thermally protecting the concrete wall 4, of the reactor building (not otherwise shown), and which surrounds the generally cylindrical pressure vessel. For simplification only one loop leg is shown, this being the cold leg pipe 5 connecting with the coolant inlet nozzle 6 of the pressure vessel and returning the circulating coolant under the force of the coolant pump 8 powered by its motor 9. Although not shown, such an arrangement is provided for each coolant loop and, in each instance, the coolant pump 8 drawing the coolant from the heat exchanger or steam generator (not shown), and returning it to the pressure vessel through the coolant leg pipe 5 and one of the vessel's inlet nozzles 6. In FIG. 1 only the hot leg or outlet nozzle 6a of the one coolant loop is illustrated, the coolant circulating from this nozzle 6a through the loop including the steam generator, and back to the inlet nozzle 6.

Two of the check valves are shown at 10 and 11, connecting the pipe 5 to the nozzle 6, in the interest of redundancy, and they may be constructed in the prior art manner. The tubular containment is shown at 14 as extending from the outer surface of the pressure vessel wall around the nozzle 6, and going through a hole 4a formed in the concrete wall 4 and through which the check valves also extend. The containment extends outwardly to beyond the outermost check valve 10, at which point it is connected to the portion of the pipe 5 adjacently beyond the outermost check valve, as indicated at 5a.

Figure 2:
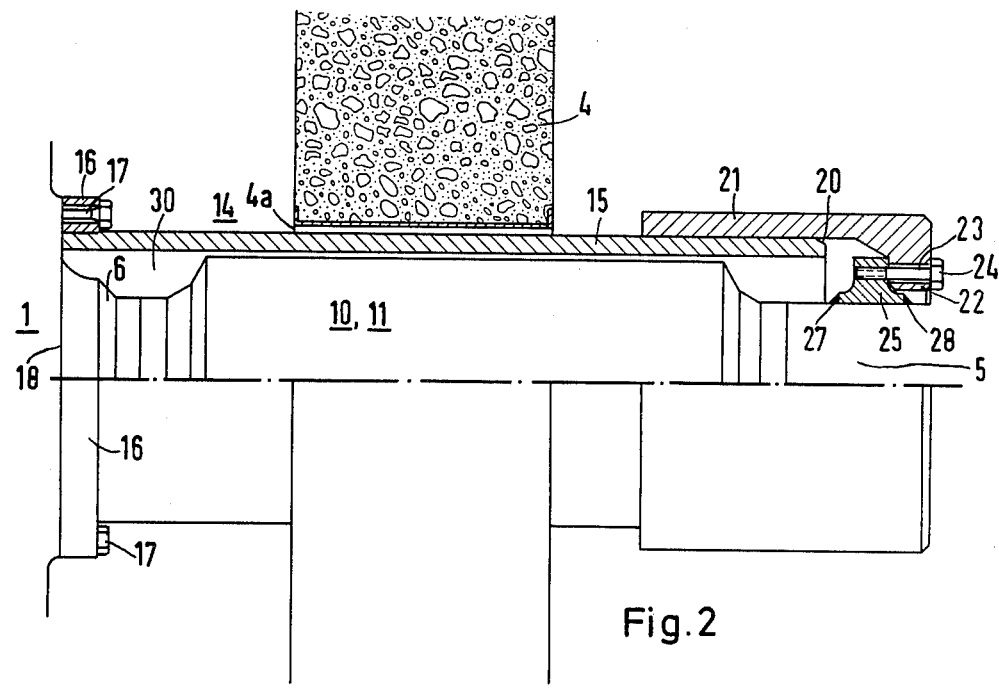
FIG. 2 shows partly in elevation and partly in longitudinal section, details of the containment.

As shown by FIG. 2, the containment 14 comprises a thick-walled cylindrical inner section 15 internally providing a small clearance between it and the outsides of the valves 10 and 11, and a small clearance between the containment and the coolant pipe hole 4a formed through the concrete wall 4. The inner end of this inner section 15 is welded to an external flange 16 secured by a series of cap screws 17 to the wall of the pressure vessel 1 surrounding the nozzle 6. The innermost one 11 of the two valves has a connection directly welded to the nozzle 6 to get the valve as close to the vessel as possible. The outer end of the inner section 15 has a chamfered edge 20 for easy insertion in a shorter outer containment section 21 which is also cylindrical and is telescoped over the outer end of the inner section 15. The fit between these parts should be tight enough to prevent excessive loss of coolant in the event of an accident inside of the containment, but so that the two parts can slide relative to each other in the axial direction of the containment. The outermost end of the outer section 21 has an inwardly extending flange 22 through which, via suitable axial holes, a number of cap screws 23 are inserted and which have heads 24 for their rotation and inner ends screwed into a flange 25 welded to the coolant pipe 5 by inner and outer circumferential welds 27 and 28. The position of this attachment is beyond the outermost one of the two check valves and any of their connections with the coolant pipe 5.

In the above way a space 30 is formed which extends from the pressure vessel 1 over both of the check valves 10 and 11 and all of their connections either with each other or the coolant nozzle 6 or the pipe 5. Therefore, any break throughout this area can only result in the then escaping coolant being held against loss from the pressure vessel, one or the other or both of the check valves 10 and 11, of course, then closing to prevent loss of the coolant through the pipe 5.

With the previously described two valves in series, to provide for redundancy, the overall length of the containment 14 may be considered to be undesirable in extent. To shorten the containment, in FIG. 3 the redundant valve 11 is shown as being installed inside of the pressure vessel 1 and will be described presently. The valve 10 is, in this instance, the primary valve and it comprises a valve head 34 positioned in the valve casing 33, necessarily of larger diameter than the pipe 5, and internally forming a valve seat 34'. The valve head 34 is generally pear shaped and points in the direction of the normal coolant flow, to provide stream lining. The back end of the valve head is supported at 35 by an elastic spider member, while its front end is supported by a spider 36 that slides inside of the pipe 5 at that end. In this way the length of the tubular containment 14 can be made shorter than it is illustrated in the case of FIGS. 1 and 2.

Figure 3:
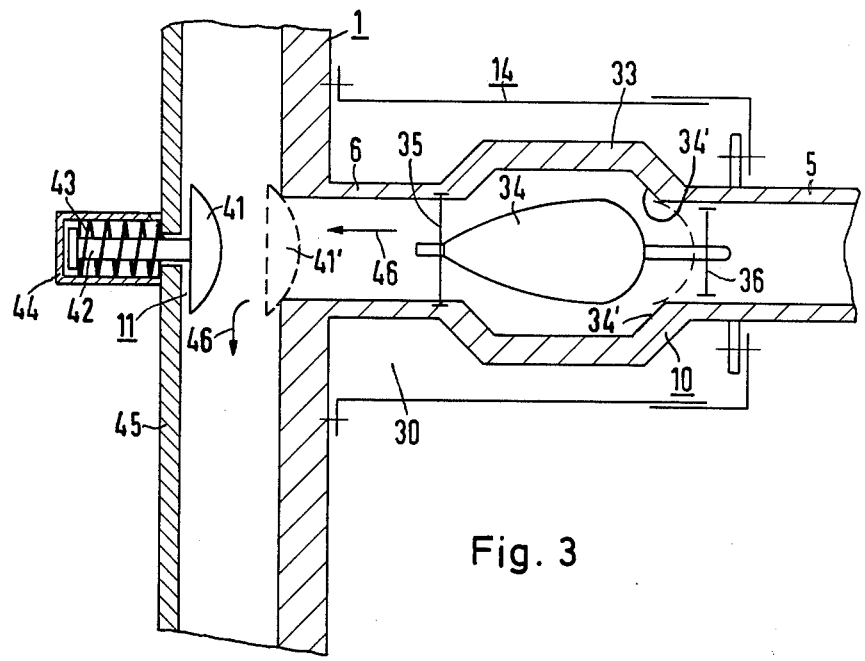
FIG. 3 schematically shows details of the valve constructions of the present invention.

To provide the redundant valve 11, a valve head 41 is positioned within the descent space between the inside of the pressure vessel and its core barrel 45, this valve head 41 being mounted by a shaft 42 having an enlarged end engaged by a compression coil spring 43 normally biasing the valve head 41 to a retracted position, these parts being mounted by a housing 44 extending within the inside of the core barrel 45. In FIG. 3 the normal coolant circulating flow direction is shown at the arrows 46.

In the event of an accident to the pipe line 5 beyond the main valve 10, the valve head 34 against the elasticity of its mounting 35 is driven forwardly to seat against the valve seat 34' formed on the inside of the casing 33. However, should this action fail for any reason, the continued reverse surge of escaping coolant, sucks the valve head 41 of the redundant valve 11 into the opening of the nozzle 6, thus stopping the outward flow of coolant.

Figure 4:
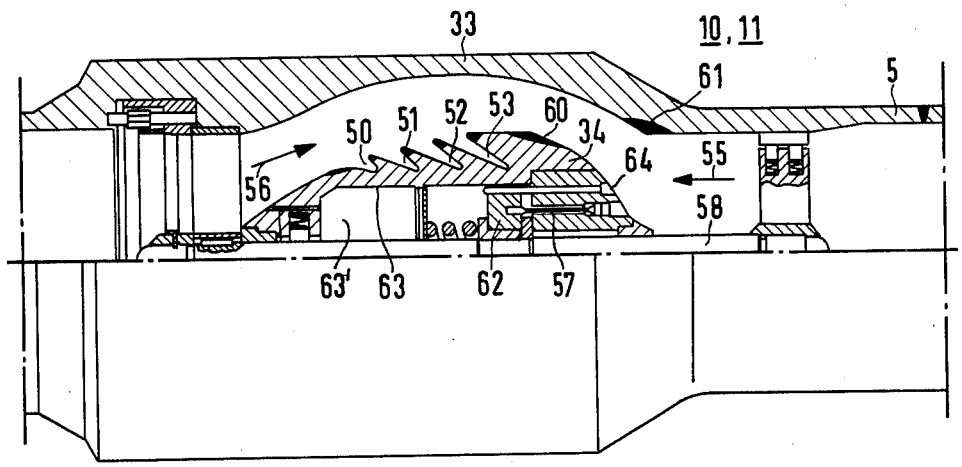
FIG. 4 partly in elevation and partly in longitudinal section shows an example of a check valve provided with means for retarding its closing.

Details of one example of the internal construction of the valve 10 are shown by FIG. 4. If the arrangement of FIG. 3 is not used, the series connected redundant valve 11 may be made in the same way.

As shown by FIG. 4, the pear-shaped valve head 43 is provided with four grooves 50 through 53 machined into its circumference as a series from the larger forward end of the valve head back along its tapering portion. These grooves are inclined backwardly with respect to the direction, indicated by the arrow 55, of the normal coolant flow and they offer little resistance to the normal coolant flow, maintaining the streamlining previously described. However, in the opposite direction, indicated by the arrow 56, the coolant discharge resulting from a rupture or break of pipe 5 beyond the valve, the circumferential and now, in effect, oppositely inclining grooves can receive a great amount of flow force for transmission to the valve head 34.

The valve head 34 is provided with hardened metal armor 60 in its forward portion and which seats against an armored valve seat 61, but this could occur with great force transmitting shock stresses to the valve casing 33 and its connected parts. To prevent this, a stationary piston 62 is fixed to an axial support 58 on which the valve head slides, the valve head being hollow and forming a cylinder 63 defining a space 63' which is normally filled with a coolant which flows through one or more inlets 64. Therefore, when the valve head is driven forwardly, it must drive the coolant in the space 63' through the inlets 64 reversely, providing a hydraulic cushioning action retarding the seating of the valve head 34 enough to prevent undue shock. The valve head displacement should be quick enough to prevent undue discharge of the coolant.

The valve head 34 is normally held open or in its unseated position, by a series of shear pins 57 which are anchored to the valve head and the stationary piston 62 and which are designed to break under the force of the discharging backwardly flowing coolant resulting from a break in the pipe 5.

Figure 5:
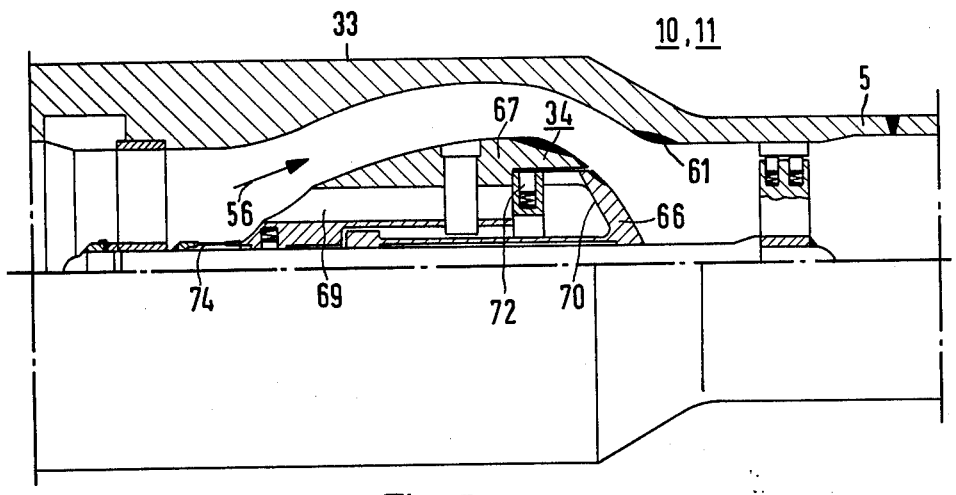
FIG. 5 is like FIG. 4 but shows a second example of the valve.

In the second example of the valve shown by FIG. 5 the valve head comprises an inner part 66 and an outer part 67 held together by detents 72, holes 69 transmitting reversely flowing or discharging coolant to the inside surface 70 of the inner part 66, the detent 72 when releasing so that the part 66 advances forwardly and partially blocks the flow path through the valve inside of its casing 33. The outer part 67 is anchored against closing motion by rupturable tension members 74 and with the flow partially blocked by the initially advanced inner part 66, the pressure differential rapidly rises so that increasing force is applied to the outer part 67, the tension members 74 being designed to then rupture and permit the valve head's outer part 67 to be forced to its closing position on the seat 61. However, at this time the flow rate has been decreased so that the valve head closing or seating shock is reduced.

It is to be understood that throughout the foregoing the high-pressure parts of the reactor coolant system have been involved. In other words, it has been intended that all references are to the main coolant lines and main coolant pumps, as contrasted to the piping, pumps and the like involved throughout the reactor auxiliary system through which a small portion of the pressurized-water coolant is passed for treatment but only after its pressure has been reduced, the treated coolant being returned to the high-pressure coolant loops by a charging pump which returns the high pressure to the coolant.

What is claimed is:

1. A pressurized-water reactor comprising a pressure vessel having at least one coolant nozzle and main coolant pipe connected to said nozzle and means for causing a normal circulation of coolant through said pipe and nozzle, said vessel and said pipe containing pressurized-water coolant, said pipe having a check valve through which the pipe is connected to said nozzle, said check valve being adapted to close in the event said normal circulation reverses due to a break in said pipe on the side of said pipe extending from said check valve away from said pressure vessel, and a pressure-resistant containment completely enclosing a space extending from said pressure vessel and surrounding said check valve, said containment being a tubular containment, said tubular containment having an inner end rigidly fixed to said vessel and the containment extending completely over the check valve and having an outer end rigidly fixed to said pipe, said tubular containment having mutually telescoped tubular sections which are slidable relative to each other in the axial direction of the tubular containment.

2. The reactor in claim 1 in which a concrete wall surrounds said vessel and has a radial hole through which said valve is positioned, and said tubular containment also extends from said vessel through said hole to form a radially inner one of its said telescoped sections, said inner one of the sections and the outside of said valve being substantially cylindrical and respectively having an inside and an outside closely interspaced, said hole being circular and having an inside diameter closely spaced from the outside of said inner one of the tubular containment's said sections, said wall having an outside and the tubular containment beyond the wall's outside having a second of its said telescoped sections forming an outer section slidably superimposed over its said inner one of its sections, said outer section having an outer end fixed to said pipe.

3. The reactor of claim 1 in which said pipe is a cold leg pipe.

4. The reactor of claim 3 in which said vessel has an inside and said inlet nozzle has an inner opening and a second check valve is positioned opposite to said opening and in the inside of said vessel, said second check valve having a head seating on the vessel's inside around said inner opening, and means for normally biasing said valve head away from said opening.

5. The reactor of claim 1 in which said check valve comprises a valve casing containing a valve seat and a valve head movable to close against the valve seat by flow of said coolant in a direction opposite to said normal circulation of the coolant, and means for retarding the movement of the valve head by said flow in said direction, to reduce the shock of the valve head closing against the valve seat.

6. The reactor of claim 5 in which said valve head internally forms a cylinder and said cylinder contains a piston which is fixed against movement, and flow restricting means connects said cylinder with coolant in said casing.

7. The reactor of claim 5 in which said valve head is formed by an outer part which closes against said seat and an inner separately movable part which receives the force of said flow in the direction opposite to the normal coolant circulating direction and can move to partly block the coolant flow through said seat, said outer part being held against moving by restraints which rupture when stresses and the two parts being interconnected by means which permits said inner part to move initially towards said seat when stressed by a lower stress than is required to effect said rupture.

* * * * *